Dec. 3, 1940.    H. G. IRWIN    2,224,052
WIND POWER MACHINE
Filed Feb. 5, 1940
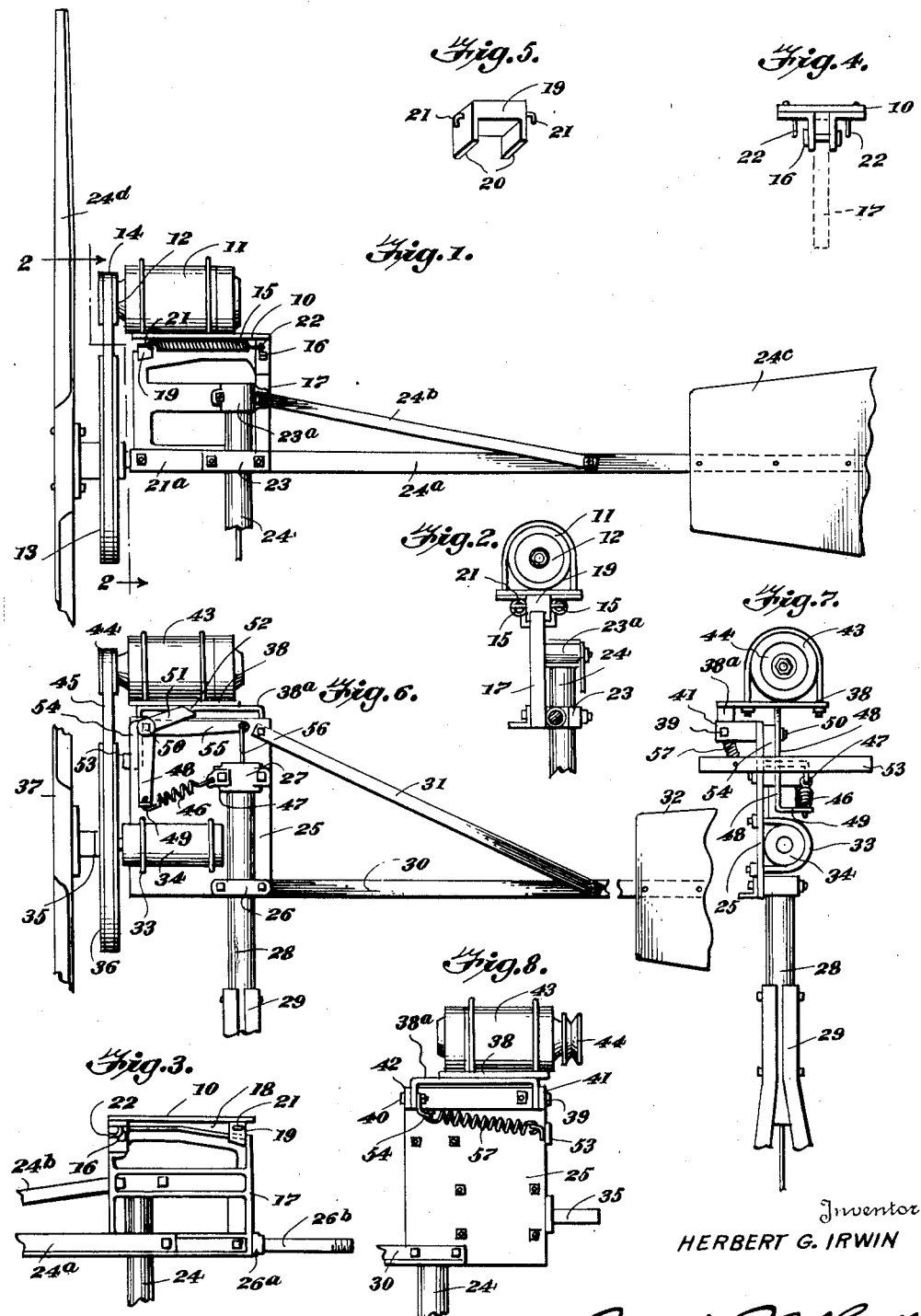
Inventor
HERBERT G. IRWIN Patented Dec. 3, 1940

2,224,052

UNITED STATES PATENT OFFICE 2,224,052

WIND POWER MACHINE

Herbert G. Irwin, Amarillo, Tex.

Application February 5, 1940, Serial No. 317,444

4 Claims. (Cl. 290—55)

My invention relates to a wind power machine of the type for use in supplying motive power for driving an electric generator, and the primary object of my invention is to provide a wind power machine of simple construction for driving a small electric generator to charge an electric storage battery.

A further object of my invention is to provide a wind power machine for use in the windy sections of the country, and which will drive an electric generator of the automotive type in an efficient manner.

A further object of my invention is to provide in a machine of the character stated, an arrangement of a substantially flat base plate whereby construction and maintenance are simplified.

A further object of my invention is to provide in a machine of the character stated a support for the bearing of the wind rotor blade and belt drive wheel that is detachable from the base plate for convenience in making adjustment or replacement of the bearings.

In the drawing—

Figure 1 is a fragmentary side elevational view showing a modified form of the invention;

Figure 2 is a vertical sectional view taken on line 2—2 of Figure 1;

Figure 3 is a side elevational view of the generator support looking at the opposite side from that shown in Figure 1;

Figure 4 is an edge elevational view of the pivot end of the generator mount;

Figure 5 is a perspective view looking at the under side of the back pressure obstruction used with the type of structure shown in Figure 3;

Figure 6 is a side elevational view of a further modified type of the invention;

Figure 7 is a front elevational view of the structure shown in Figure 6 with certain parts removed; and Figure 8 is a side elevational view looking at the opposite side to that shown in Figure 6.

By referring particularly to Figures 1 to 5, it will be noted that a conventional V-type belt 14 is disposed on the generator pulley 12 and the belt wheel 13. An electric generator 11 is attached to a generator mount or platform 10 which is pivoted at 16 to the upper corner of the upright base 17 which latter is provided with an inclined upper edge 18—note Figure 3—upon which a belt back-pressure obstruction comprising a spring-pulled prop 19 slides under the generator mount 10 to lift the generator and thereby cause the pulley 12 to press into the bight of the drive belt 14. The under side of the prop 19 is provided with retainer flanges 20 which fit upon opposite sides of the inclined edge 18 to prevent displacement of the prop as it is pulled along the inclination 18 by a pair of spiral pull springs 15. This spring-pulled prop 19 straddles the inclined edge 18, as is shown in Figure 2, and the springs 15 preferably fit upon opposite sides of the spring-pulled prop 19, as is shown in Figure 2, the springs being secured to the prop 19 by engaging the hooks 21 at one end. The opposite ends of the springs 15 are anchored to the generator mount by suitable projecting hooks 22.

The springs 15 may be unhooked from the prop 19 and the prop removed from between the mount 10 and the inclined edge 18 when it is desired to lower the generator for convenient removal or replacement of the belt 14. Upon replacing the belt on the pulley 12 and drive wheel 13 and lifting the generator and mount with the hand or with a suitable pry bar (not shown) the prop 19 may be replaced on the inclination 18 and the springs 15 rehooked in position. The springs 15 are sufficiently strong to pull the prop 19 up the inclination 18 far enough to lift the mount 10 and generator 11 to properly tighten the belt 14 and any slight elongation of the belt which may occur in use is compensated for by the constant pull of the springs 15 which slide the prop 19 further up the inclination 18, in this way pressing the pulley 12 further into the bight of the belt 14. The prop 19 provides a substantial obstruction against back movement of the mount 10 and generator by pulling strains exerted on the generator by the drive belt 14 under various loads and speeds.

As shown in Figure 1, the upright base 17 carries a journal 23 and an inverted socket 23ª for receiving the vertical supporting shaft 24. The upright base 17 carries a vane arm 24ª which is braced by means of a bracing arm 24ᵇ and carries a vane 24ᶜ for directing the base plate 17 edgewise toward the wind. A suitable wind rotor blade 24ᵈ is mounted forwardly of the base 17 and the wheel 13, for driving the wheel 13. A governor of the centrifugal fan type—not shown—may be attached to the wind rotor blade for limiting its speed in high winds, as is common with such a structure.

As shown in Figures 2 and 3, the upright base 17 carries adjacent the lower edge thereof a horizontally disposed bearing support 26ª, which bearing support carries a spindle projection 26ᵇ. This spindle projection 26ᵇ receives and supports the hub of the wind rotor blade 24ᵇ and the hub of the belt drive wheel 13.

By noting Figures 6 to 8 inclusive, it will be seen that 25 designates a substantially flat base plate carrying a laterally projecting pivot sleeve or journal 26 and an aligned downturned socket 27 for pivotally mounting the base 25 in an upright position on a vertical supporting shaft 28 carried by a suitable tower 29. A horizontally disposed vane arm 30 is attached to the base plate 25, the vane arm 30 being braced by means of the angle brace 31 and supporting a wind vane 32 for directing the base plate 25 edgewise toward the wind—note Figure 6.

As shown in Figure 6, the base plate 25 carries a pair of U-bolts 33 adjacent the lower edge thereof in horizontally disposed position for providing a support for the bearing 34. This bearing 34 is provided with a spindle projection 35, which projection receives the hub of a belt drive wheel 36 and the hub of a wind rotor blade 37, which wind rotor blade 37 revolves forwardly of the front edge of the base plate 25. A suitable governor of the centrifugal fan type—not shown—may be attached to the wind rotor blade for limiting its speed in high winds as is usual with such a type of structure.

A generator mount 38 is supported for retraction above the upper edge of the base plate 25 and this mount 38 is attached to a pivot bracket 38ᵃ which bracket is attached by pivot bolts 39 and 40 to the outer end portions of the arms 41 and 42—note Figure 8—the arms 41 and 42 projecting laterally from the side portion of the base 25, as shown in Figures 7 and 8. The generator mount 38 supports an electric generator 43, which generator 43 carries a pulley 44 in alignment with the belt drive wheel 36 and receives a drive belt 45. A spiral pull spring 46 for lifting the generator mount 38 which carries the generator and causes the pulley 44 to press into the bight of the belt 45 has one end anchored, as at 47, to the socket 27, and the other end is connected to the arm extension of the prop 48, as at 49, the prop 48 being pivoted, as at 50. The prop 48 is provided with an upwardly inclined arm 51 having a cam-shaped upper end 52 which abuts the under side of the generator mount 38—note Figure 6. The pressure of the spring 46 causes the cam 52 to press against the bottom of the mount 38 and produces a function to stabilize the mount 38 and generator against back-movement from pulling pressure of the drive belt while in motion.

A horinzontally disposed brake bar 53 extends transversely across the front edge of the base plate 25, as shown in Figure 7, and this horizontally disposed brake bar 53 is carried by a bell crank lever 54 which is pivoted to the base plate 25 and is provided with a rearwardly extending arm 55 and is engaged by a suitable flexible element 56 by which the brake bar 53 may be brought into contact against the side of the belt drive wheel 36. The flexible element or cable 56 may be operated from any desired point by hand. A spiral spring 57 is connected at one end to the rear face of the brake bar 53 and its opposite end is anchored, as at 54, near the upper end of the base plate 25, and tends to pull the brake bar 53 out of contact with the wheel when the pull element 56 is released.

What I claim is:

1. In a wind power electric generator drive, a base plate adapted to be mounted in an upright position for flatwise rotating movement on a vertical shaft support, means for attaching a wind vane supporting arm onto said base plate for directing said plate edgewise toward the wind, means for detachably mounting a horizontally disposed bearing support onto one side of said base plate adjacent to the lower edge thereof for supporting a wind rotor blade with a belt drive wheel in a position to revolve forwardly of the front edge of said base plate, and means for mounting a belt drive electric generator with its drive pulley in alignment with said belt drive wheel for retraction adjacent to the upper edge of said base plate.

2. In a wind power belt drive for an electric generator, a base plate with a wind vane and a laterally disposed adapter for mounting said plate in an upright position on a vertical shaft support for flatwise rotating movement.

3. In a wind power electric generator drive, a base plate adapted to be mounted for rotating movement on a vertical supporting shaft, a wind vane for rotating said base plate on the supporting shaft, a belt drive wheel carried by said base plate, a wind rotor blade for driving said belt drive wheel, a spring pressed retractile generator mount for supporting a belt drive electric generator in a position to be driven from said belt drive wheel by a belt, and spring actuated means for automatically scotching said generator mount against movement toward said belt drive wheel by belt pulling force.

4. In a wind power electric generator drive, a support adapted to be mounted for rotating movement in a horizontal plane by a wind vane, a belt drive wheel carried by said support, a wind rotor blade for driving said belt drive wheel, a generator mount rockably mounted upon said support for supporting a belt drive generator in a position to be driven from said belt drive wheel by a belt, means for automatically moving said generator mount in a direction away from said belt drive wheel to automatically take up slack of the generator drive belt, and means for automatically obstructing movement of the generator mount in the direction toward said belt drive wheel by belt pulling force.

HERBERT G. IRWIN.